UNITED STATES PATENT OFFICE.

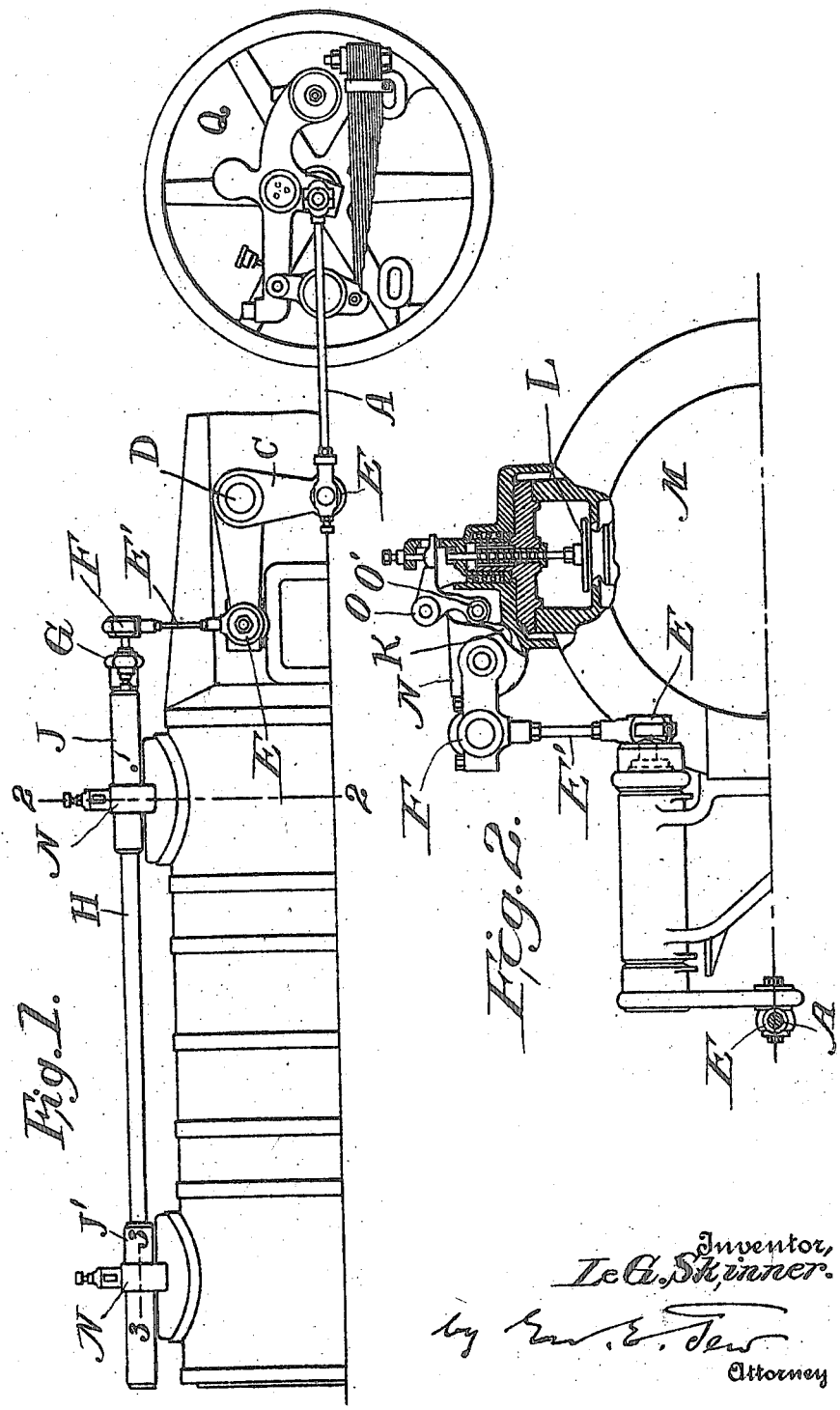

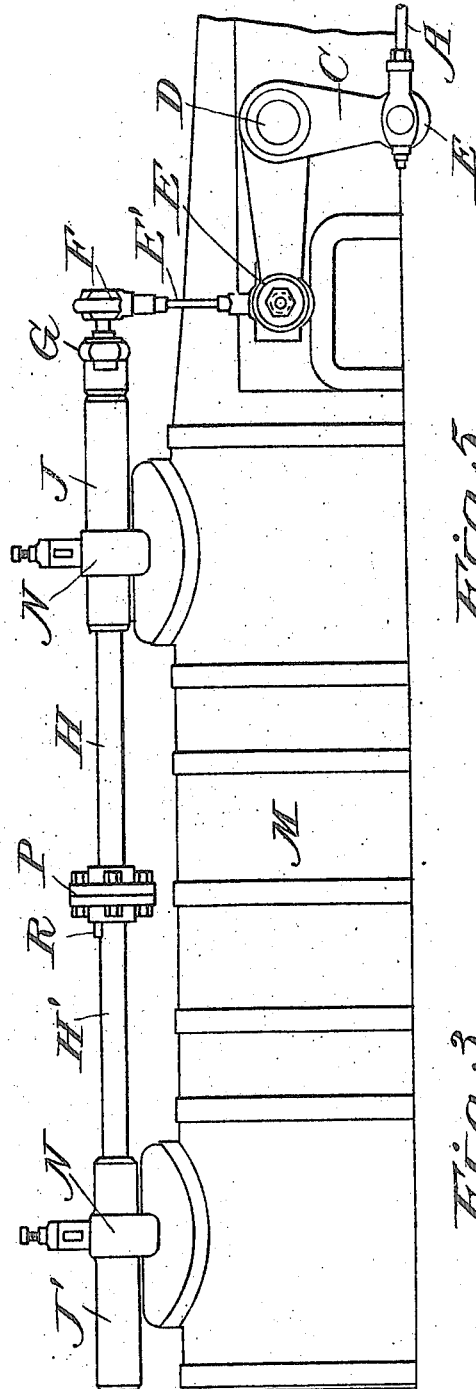

LE GRAND SKINNER, OF ERIE, PENNSYLVANIA.

VALVE-GEAR.

1,255,476.   Specification of Letters Patent.   Patented Feb. 5, 1918.

Application filed July 20, 1917. Serial No. 181,832.

*To all whom it may concern:*

Be it known that I, LE GRAND SKINNER, a citizen of the United States, residing at Erie, in the county of Erie and State of Pennsylvania, have invented certain new and useful Improvements in Valve-Gears, of which the following is a specification.

This invention relates to steam engine valve gear, and is particularly useful in connection with engines using puppet valves and has for its main object to provide a gear which will permit or accommodate differential expansion of the cylinder and valve gear without impairing or distorting the operative functions of the gear, or in other words, the timing of the valves.

It is known that when steam is supplied to a cylinder the cylinder expands more than the valve gear exterior thereto, which varies the positions of the valves with respect to the gear, and considerable difficulty on this account has been experienced. Thus the expansion sometimes causes one valve to lift more than the other, because of the variation in relative position, which makes the engine develop more power on the side of the piston having the valve with the highest lift or greatest opening.

The distortion increases with the temperature of the steam and consequently the variation unbalances the load on opposite sides of the piston because the valve gear, not being exposed to the steam, does not expand accordingly. On uniflow engines the distortion is even greater than in counter-flow engines, because the cylinder elongates to a greater extent because it is not cooled by the reverse flow of the exhaust steam, as in a counter-flow, and because the cylinder is usually longer than in the counter-flow type.

By means of the present invention these objections or defects are remedied, and a gear is provided which is accurate under all conditions of temperature.

This is effected by providing a gear whose operative mechanism acts at right angles to the longitudinal expansion and contraction in the cylinder; and therefore by its construction prevents distortion of steam distribution. This construction, moreover, permits the valve operating mechanism to move with the expansion of the cylinder but in such a direction as not to disturb the steam distribution, or timing of the opening and closing of the valves.

This gear also permits the use of a governor mounted directly on the engine shaft, which has advantages over a governor mounted on a lay shaft for the reason that a governor mounted on the engine shaft may be larger and, in consequence, more powerful and will therefore give better regulation than the necessarily small governor mounted on a lay shaft. Moreover this construction eliminates the usual gear driven lay shaft alongside of the bed.

It will be understood that the valves are mounted on or carried by the cylinders or cylinder heads, and as the cylinder expands or contracts the valves are shifted in a direction parallel to the cylinder axis, the gear to a large extent remaining unaffected by the heat, and consequently suffering little or no change in position.

When such a gear as my invention provides is associated with a governor of the fly wheel type the functions of the governor are accordingly exactly preserved whereas in prior constructions the cylinder expansion disturbs the automatic regulation, with consequent irregularities of operation.

More specifically, the invention embodies a lay shaft which extends lengthwise beside the cylinder and is rocked by connection with the governor, the motion of the lay shaft being communicated to the valves by suitable intermediate devices, and the means for accommodating the expansion referred to are preferably embodied in the mechanism between the lay shaft and the valves, or in the lay shaft itself.

The invention may be embodied in a variety of constructions, some of which are disclosed herein:—

In the accompanying drawings—

Figure 1 is a side elevation showing the valve gear applied to a cylinder with which puppet valves are used;

Fig. 2 is an elevation and partial cross section on the line 2—2 of Fig. 1;

Fig. 3 is a section on the line 3—3 of Fig. 1;

Fig. 4 is a side elevation of a modification in which the lay shaft is made in sections with an expansion coupling therebetween; and Fig. 5 is a detail in section of the expansion coupling; and Fig. 6 is a detail in section of a modification.

Referring specifically to the drawings, A is the eccentric rod which may be connected to any suitable operating device such for example as the fly wheel governor shown in my U. S. Patent No. 628,591, and indicated as a whole at Q. From this rod motion is communicated to one arm of a bell crank lever C mounted on the rocker shaft D, the other arm of the lever being connected preferably by universal joints E and F and link E' to the arm G on the lay shaft H. This shaft is supported in bearings attached to the cylinder or cylinder heads, in housings J, J', and on this shaft is mounted the cams K which operate the puppet valves L of the cylinder M. The valves are of a known type and are lifted and dropped in the operation of the engine by the rocking action of the lay shaft, the cams of which act on rollers O' carried by bell cranks O which engage the valve stems in a known manner.

While puppet valves are shown in the drawings, the invention is not limited to the use of puppet valves in connection with the mechanism described. Another feature of this construction is the use of a link E' with universal joints E and F for operating the valve gear, which permits longitudinal expansion of the cylinder and bed without disturbing the timing of the opening and closing of the valves. Moreover this construction permits a change of the direction of oscillation from a crank oscillating on a shaft at right angles to the center line of the engine to a crank attached to a shaft oscillating on a line parallel to the center line of the engine.

When steam is supplied to the cylinder it expands and in order that this expansion shall not affect the timing, such distortion may be prevented in various ways.

One way is to allow sufficient clearance at each side of the cams K in the cam boxes N which inclose the same, to permit at least one of the bearing housings J, J' which go with the cylinder, to shift along the lay shaft, the cams K sliding or shifting laterally across the rollers O' without varying the valve operating function of the cams. Naturally, the valve and housing J' at the head end of the cylinder will show the greatest variation in position incident to the expansion of the cylinder, wherefore the lay shaft will ordinarily be mounted in a fixed position in the housing J at the frame end of the cylinder, without any longitudinal slide or shift, said shift being provided for at the housing J' on the head end of the cylinder. Any expansion between the other connecting parts is permitted by the universal or globe joints E and F which accommodate expansion between the bed and cylinder without causing any binding. The shift or slide permitted is in a direction parallel to the axis of the cylinder or transverse to the direction of the transmission of power from the lay shaft to the bell cranks O, and consequently the angular relation of the cams with respect to the bell cranks is not varied, and the valve operation remains as originally determined or as regulated by the governor. The result therefore follows from the location of the lay shaft parallel to the cylinder axis and the provision of a connection from the shaft to the valves permitting variation in the relative position of the valves incident to expansion without distortion of the action. The construction just described is shown particularly in Figs. 1 to 3; the latter, especially, showing the clearance between the sides of the cams and the cam boxes N.

Another way of accomplishing the same result is to make the lay shaft in two sections H and H' as shown in Figs. 4 and 5, the sections being connected by a coupling P permitting the sections to shift with respect to each other, as by a feather R on one shaft section which will transmit the oscillating motion and permit the longitudinal shift incident to changes in the valve locations due to expansion of the cylinder. In this construction the shafts may be mounted in the housings J without any sliding action, the shaft sections shifting with the housings, the sliding action or elongation of the lay shaft being permitted by the coupling P and the feather.

For the purpose of illustration I have shown two ways of realizing the invention, but it is not limited thereto, as it may be embodied in other arrangements having the same result. For example, compensation for expansion could also be provided by mounting the cam K slidably on the shaft H by means of a feather, as shown in Fig. 6 at h.

What I claim is:—

1. The combination with an engine cylinder, valves and crank shaft, of a governor on the crank shaft, a rocker operatively connected to the governor, the axis of the rocker being transverse to the axis of the cylinder, a lay shaft extending parallel to the cylinder and connected to the rocker, and operating devices between the lay shaft and the valves, said devices being movable lengthwise of the cylinder with respect to the lay shaft, without varying the functional relation of the lay shaft to the valves or the governor.

2. In an engine valve gear, the combination of a rocker oscillating on an axis at a right angle to the engine cylinder axis, a lay shaft parallel to the cylinder axis, and connecting means between the rocker and lay shaft, to operate the latter, said means including universal joints permitting variations in relative position between the shaft and rocker, the lay shaft being movable longitudinally relative to the cylinder, whereby expansion of the cylinder will not vary the angular relation of the lay shaft and the rocker.

3. The combination with an engine cylinder and its valves, of a valve-operating lay shaft extending beside the cylinder and parallel thereto, a lever vibrating on an axis at an angle to the axis of said shaft, and connected to the lay shaft, and means to operate the lever, the lay shaft being movable longitudinally, relative to the cylinder, whereby expansion of the cylinder will not vary the angular relation of the lay shaft and the lever.

4. In a valve operating mechanism for engines, the combination with a governor on the engine shaft, of a rocker actuated thereby and having means to produce oscillation in a plane parallel to the center line of the engine, and means to convert said oscillations into oscillations in a plane at a right angle to said center line, the last mentioned means including a lay shaft extending parallel to said center line, the lay shaft being movable longitudinally relative to the cylinder, whereby expansion of the cylinder will not vary the angular relation of the lay shaft and the rocker.

5. In an engine valve-gear, the combination with an engine cylinder, its valves and crank shaft, of means actuated by the crank shaft to produce reciprocating movements in a plane parallel to the axis of the engine cylinder, and means to convert said movements into movements at a right angle to said axis and transmit same to the valves, the last mentioned means including devices to permit variation of the position of the valves without varying the angular relation of the movements so converted.

In testimony whereof, I affix my signature in presence of two witnesses.

LE GRAND SKINNER.

Witnesses:
ALBERT E. ROSE,
H. E. COBURN.